UNITED STATES PATENT OFFICE.

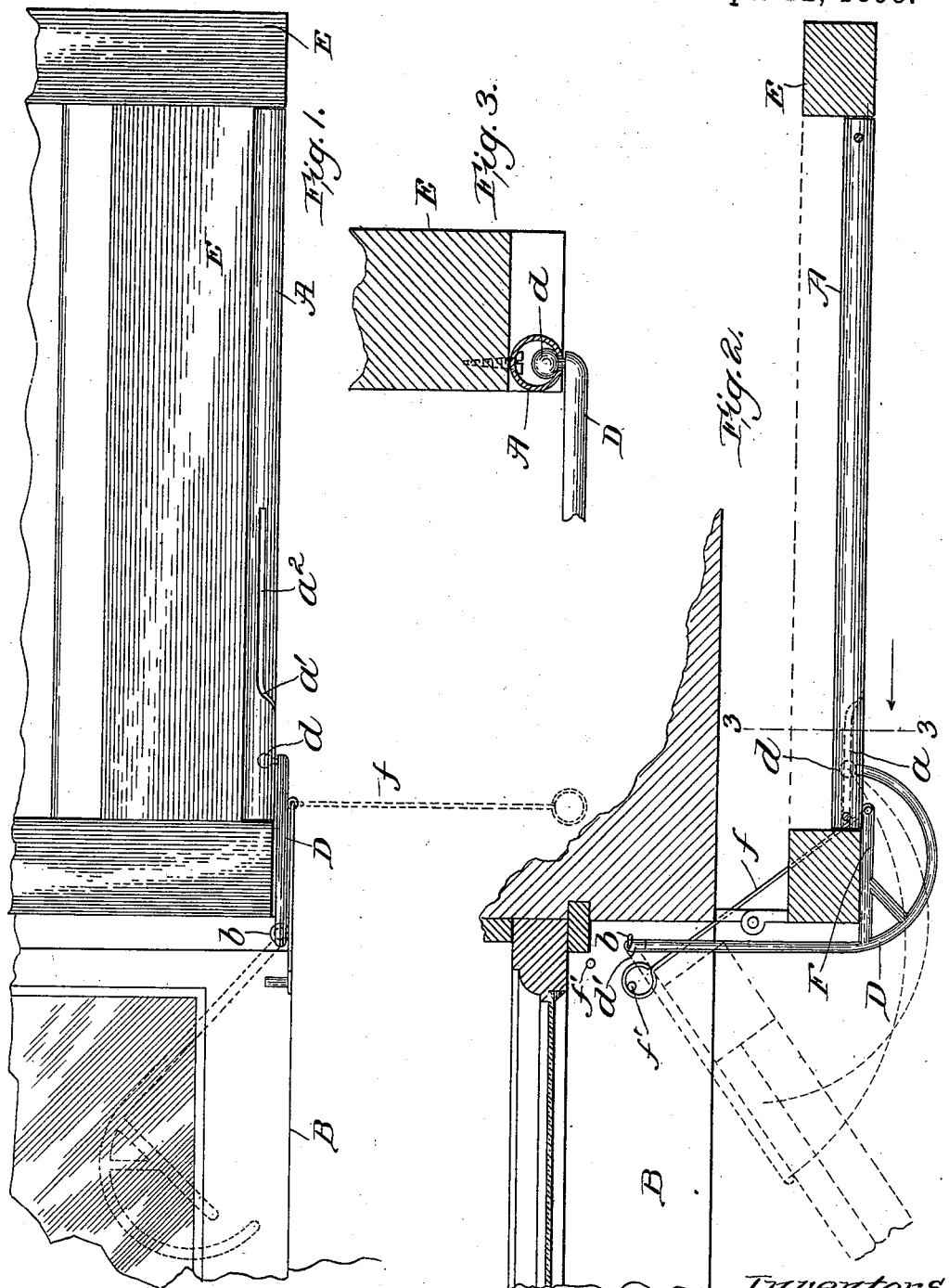

CHARLES B. HARKNESS, OF READING, AND WILLIAM T. CROWELL, OF BOSTON, MASSACHUSETTS.

SHUTTER-CONTROLLER.

SPECIFICATION forming part of Letters Patent No. 602,323, dated April 12, 1898.

Application filed February 3, 1898. Serial No. 668,935. (No model.)

*To all whom it may concern:*

Be it known that we, CHARLES B. HARKNESS, of Reading, Middlesex county, and WILLIAM T. CROWELL, of Boston, Suffolk county, Massachusetts, have invented an Improved Shutter-Controller, of which the following is a specification, reference being had to the accompanying drawings, in which—

Figure 1 is an elevation of a shutter and part of a window, showing our device in position. Fig. 2 is a plan of Fig. 1; and Fig. 3 is a section on line 3 3 of Fig. 2, looking in the direction of the arrow.

Our invention is a device for moving a window-shutter upon its hinges from the open to the closed position, or vice versa; and it consists, essentially, in a bent lever pivoted at one end to the window-sill and at the other end engaging a rod or the like secured to the bottom of the shutter in such a fashion that as the lever and shutter turn upon their respective pivots the end of the lever may move along the rod.

The great advantage of our device consists in the fact that by its use the shutter may be closed or opened without the dangerous and inconvenient leaning from the window necessary when the ordinary shutter-fastenings are used, while by simple means the shutter may be secured in the open or closed position or in any intermediate position.

In the drawings, A is a tube having a longitudinal slot $a$ $a'$ $a^2$, the parts $a$ $a^2$ of the slot being ninety degrees apart upon the circumference of the tube and connected by an oblique portion $a'$ of the slot, as will be plain from an inspection of Figs. 1 and 2. Pinned to the window-sill B by a pin $b$ is a bent lever D, having at its inner end a swivel-joint $d'$, which engages the pin $b$, and having at its outer end a ball $d$, connected to the lever by a neck and fitting within the tube A, while the neck fits in the slot $a$ $a'$ $a^2$. The tube A is secured to the lower end of a shutter E, as shown in Figs. 1 and 2. The slotted tube A is secured in place, with the ball $d$, fast to the end of the bent lever D, in position within the slot $a$. Projecting within the curve of the lever D from the straight portion of the lever is a piece F, (see Fig. 2,) which carries at its free end by a loose connection a handle $f$, having an eye at its lower end.

We have mentioned above and shown in the drawings the part of our controller attached to the shutter as a tube, but obviously the slot may be made by guide-strips properly placed.

Assuming the shutter to be open, the mode of operation will be as follows: One end of the bent lever being swivel-jointed and secured to the sill of the window it is obvious that when the lever is pulled in the direction of the arrow in Fig. 2 by means of the handle $f$ the ball $d$ will travel upon a circle of which the inner end of the lever is the center, while the shutter will turn upon its hinges as a center. The consequence will be that as the circle in which the end of the bent lever turns is larger than that in which that part of the tube turns with which it at first engages the ball on the bent lever will almost immediately move along the slot of the tube toward the other end of the tube as the shutter turns. If the bent lever retained its starting position—that is, moved in the same plane—until the shutter was entirely closed, it is obvious that it might pass under the window and prevent the window from being closed or it might interfere with the operation of a screen upon the window in the same way; but before the shutter has turned far enough to bring the lever beneath the window the ball upon its outer end enters the cam-slot $a'$, and the lever is turned upward against the shutter as the ball passes to the slot $a^2$, which is on the outer face of the tube, the swivel-joint permitting this turn of the lever. When the shutter is opened again, this process is reversed and the lever lowered into position as the shutter swings outward and backward.

As a practical matter we have found it best to locate the cam-slot $a'$ so that the turning of the lever will be accomplished at the time when the shutter and the lever lie upon parallel lines, as shown in Fig. 2, for at this time there is no tendency of ball $d$ to bind in the slot.

The purpose of the part F, with its handle, is to impart to bent lever D a torsional strain, which will tend to turn it upon its axis and up against the shutter as soon as it enters the cam part *a'* of the slot. The eye upon the end of handle *f* is used to engage pin *f'* to fix the lever D in position, thus securing the shutter in its open or closed position, and by means of additional pins it is obvious that the shutter may be secured in intermediate positions.

The dotted segmental circles in Fig. 2 show the path of the ball *d* and of the portion of the tube with which it is at first engaged.

What we claim is—

1. The shutter-controller consisting of a lever pivoted at one end to the sill of the window and bent at its other end to engage a slot in a tube fast to the shutter so as to permit longitudinal movement of the end of the lever along the slot and to permit the rotation of the lever; that tube having slots along its side in two planes ninety degrees apart, the two slots being connected by a slot; all organized and operating substantially as described.

2. The shutter-controller consisting of a lever-swivel pivoted at one end to the sill of the window and bent at its other end to engage a slot in a tube fast to the shutter so as to permit longitudinal movement of the end of the lever along the slot and to permit the rotation of the lever; that tube having slots along its side in two planes ninety degrees apart, the two slots being connected by an oblique slot; all organized and operating substantially as described.

3. The shutter-controller consisting of a lever-swivel pivoted at one end to the sill of the window and bent at its other end to engage a slot in a tube fast to the shutter so as to permit longitudinal movement of the end of the lever along the slot and to permit the rotation of the lever; that tube having slots along its side in two planes ninety degrees apart; the two slots being connected by a slot; and a piece F fast to and projecting substantially at right angles from the lever to serve as a handle for the lever and adapted to give a torsional strain to the lever calculated to turn it upon the swivel when it is free to move, all organized and operating substantially as described.

CHAS. B. HARKNESS.
WM. T. CROWELL.

Witnesses:
O. R. MITCHELL,
F. E. McDONELL.